Aug. 24, 1948.   R. W. CARTER   2,447,931
MECHANICAL MOVEMENT DEVICE
Filed Oct. 17, 1946

INVENTOR
RUSSELL W. CARTER
BY *Bair & Freeman*
ATTORNEYS

Patented Aug. 24, 1948

2,447,931

UNITED STATES PATENT OFFICE 2,447,931

MECHANICAL MOVEMENT DEVICE

Russell W. Carter, Des Moines, Iowa, assignor of thirty per cent to Wheelock and Cummins, Inc., Des Moines, Iowa, a corporation of Iowa Application October 17, 1946, Serial No. 703,792

4 Claims. (Cl. 74—82)

1

This invention relates to a mechanical movement translating device and particularly to a mechanical movement wherein the motion of a rotating prime mover is translated to one shaft which rotates continuously at constant speed and is also translated to another shaft which is rotated first in one direction and then in the opposite direction, or in other words, oscillated about its axis of rotation. The invention is particularly applicable to driving the wringer or spinner and the oscillating agitator mechanism of a domestic clothes washing machine, but is not limited thereto.

It is an object of the invention to provide a very simple, low cost mechanical movement translating device of the type above referred to wherein gears, reversing devices and clutches are dispensed with.

It is another object of the invention to provide a mechanical movement of the type described wherein the shaft which is oscillated may be oscillated through more than 180° of rotation, if desired, and wherein the amount of oscillation may be readily adopted for the particular device to which the movement is applied.

It is also an object of the invention to provide a mechanical movement of the type described which has an extremely long life and is capable of effecting millions of reciprocations of the agitator mechanism without undue wear.

It is a further object of the invention to provide a mechanical movement translating device which is capable of producing relatively great turning torque on both a continuously rotating shaft and on an oscillating shaft.

It is an important object of the invention to utilize belt drives exclusively for effecting the mechanical motions described herein.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

2

Figure 1:
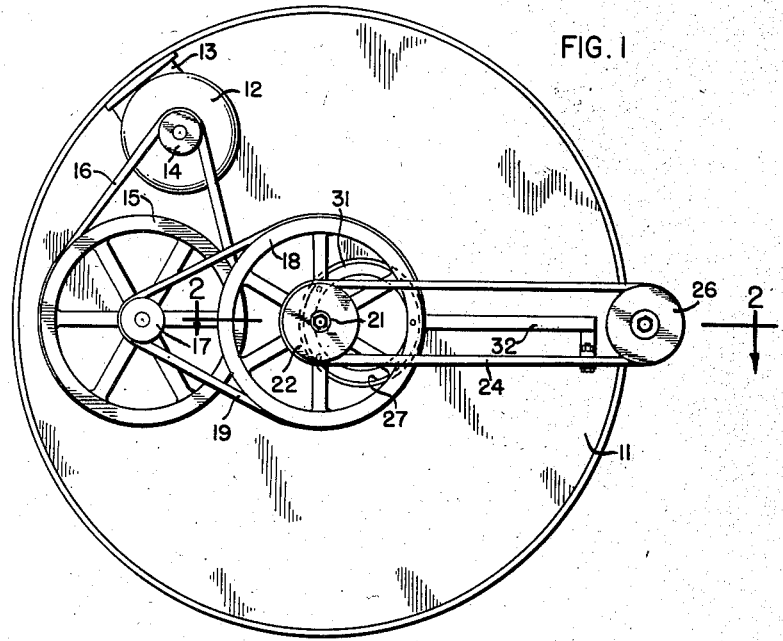
Figure 1 is a bottom plan view of the mechanical movement device looking upward toward the tub of a domestic washing machine.
Figure 2:
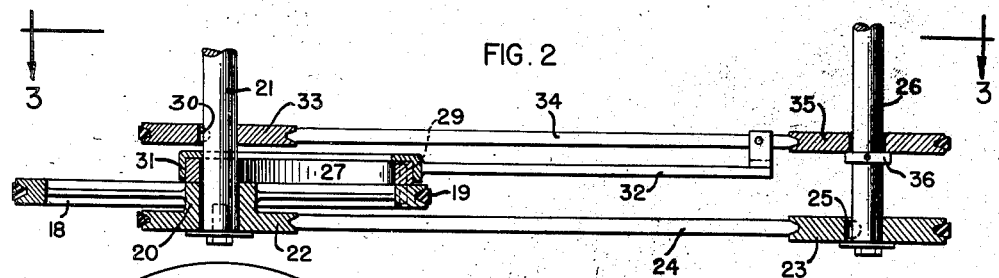
Figure 2 is a sectional view of the device taken on line 2—2 of Figure 1.
Figure 3:
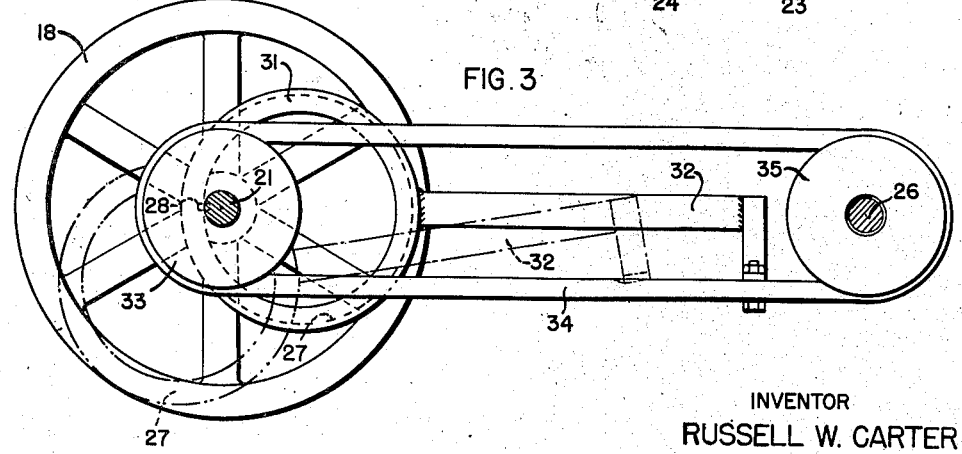
Figure 3 is an enlarged top plan view of the mechanical movement device taken on line 3—3 of Figure 2, the dot and dash lines indicating a different position which the parts assume as the prime mover is rotated.

Referring specifically to the drawings for a detailed description of the invention, numeral 11 designates the bottom of a washing machine tub which has a prime mover in the form of a rotating electric motor 12 suspended therefrom by a bracket 13. The motor 12 is provided with a sheave 14 which drives a large pulley 15 preferably through a V-belt 16. The pulley 15 is likewise provided with a small sheave 17 which drives a large master pulley 18 preferably through a V-belt 19. The master pulley 18 is provided with a hub 20 which is journalled and freely rotates on a shaft 21, which, in a washing machine, is an oscillating agitator shaft. The shaft 21 is used for convenience, although an additional shaft could be provided, if desired, as will be apparent as the description proceeds. Obviously, the size of the sheaves and pulleys thus far described may be varied to secure any speed reduction or variation desired.

The hub 20 is provided with a smaller sheave 22, located below the master pulley, although it could be located above, if desired. The sheave 22 drives a pulley 23 through a V-belt 24, the pulley 23 being keyed at 25 to a shaft 26, which, in a washing machine, is a wringer shaft and is continuously rotated in one direction as the master pulley 19 and hub 20 rotate.

An eccentrically disposed trackway 27 is keyed to the hub 20 at 28 and is provided with a peripheral flange 29, on which an L-shaped ring 31 is slidably supported. An arm 32 is rigidly secured to the ring 31 and extends radially therefrom outwardly of the circumference of the ring 31. A pulley 33 is keyed at 30 to the agitator shaft 21 and is driven by a V-belt 34, to which the outer end of the arm 32 is secured, which belt 34 passes around an idler sheave 35 journalled and freely rotatable on wringer or spinner shaft 26 and supported by collar 36. The shaft 26 is used for convenience, although a separate bearing may be provided for idler sheave 35, if desired.

The various pulleys, sheaves and shafts may be supported from the washing machine in any suitable manner, such structure forming no part of the present invention.

Operation

In operation, when the motor 12 is energized, pulley 15 is rotated, which drives master pulley 18, hub 20 and sheave 22. The wringer or spinner shaft 26 is, therefore, rotated continuously in one direction, it being obvious that the size of the sheaves 22 and 23 may be varied to obtain high speeds for spin drying and slower speeds for wringer drying.

As master pulley 18 is rotated, the eccentrically disposed trackway 27 is carried thereby. Ring 31 slides on the trackway 27 and arm 32 is, therefore, reciprocated, thus reciprocating belt 34 and oscillating pulley 33 and shaft 21. It is obvious that the degree of oscillation may be varied by changing the diameter of the trackway 29 and ring 31, thus varying the stroke of the reciprocating arm 32.

From the foregoing it will be apparent that I have provided a simple, inexpensive mechanical motion for imparting rotating movement to one element and oscillating movement to another element, which motion is particularly adaptable to clothes washing machines. Furthermore, the full power of the prime mover is utilized with very little frictional loss and long life of the parts is insured.

Some changes may be made in the construction and arrangement of the parts of my mechanical movement device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. A mechanical motion device comprising a rotating prime mover, a first shaft, means for transmitting the motion of the prime mover to rotate said first shaft continuously in one direction, said means including a master pulley, a second shaft, a trackway mounted eccentrically with respect to said second shaft and rotated by said master pulley, a pulley secured to said second shaft, an idler pulley journalled on said first shaft, a belt connecting said last two pulleys, and means for connecting said eccentric trackway to said belt to reciprocate the belt and oscillate said second shaft.

2. A mechanical motion device comprising a rotating prime mover, a first shaft, a second shaft, means for transmitting the motion of the prime mover to rotate said first shaft continuously in one direction, said means including a master pulley journalled on said second shaft, a pulley driven by said master pulley and secured thereto, a second pulley secured to said second shaft, a pulley secured to said first shaft, an idler pulley journalled on said first shaft, a belt connecting the pulley secured to the master pulley with the pulley secured to the first shaft, a second belt connecting the pulley secured to the second shaft and the idler pulley on the first shaft, and means for imparting reciprocating motion to said second belt, which means is driven by said master pulley to oscillate said second shaft.

3. Drive mechanism for a clothes washing machine comprising a rotating prime mover, a wringer shaft, means for transmitting the motion of the prime mover to rotate said wringer shaft continuously in one direction, said means including a master pulley, an agitator shaft, a trackway mounted eccentrically with respect to said agitator shaft and rotated by said master pulley, a pulley secured to said agitator shaft, an idler pulley journalled on said wringer shaft, a belt connecting said last two pulleys, and means for connecting said eccentric trackway to said belt to reciprocate the belt and oscillate said agitator shaft.

4. A drive for a clothes washing machine comprising a rotating prime mover, a wringer shaft, an agitator shaft, means for transmitting the motion of the prime mover to rotate said wringer shaft continuously in one direction, said means including a master pulley journalled on said agitator shaft, a pulley driven by said master pulley journalled on said agitator shaft, a second pulley secured to said agitator shaft, a pulley secured to said wringer shaft, an idler pulley journalled on said wringer shaft, a belt connecting the pulley driven by the master pulley with the pulley secured to the wringer shaft, a second belt connecting the pulley secured to the agitator shaft and the idler pulley on the wringer shaft, and means for imparting reciprocating motion to said second belt, which means is driven by said master pulley to oscillate said agitator shaft.

RUSSELL W. CARTER.

REFERENCES CITED

The following references are of record in the file of this patent:

UNITED STATES PATENTS

| Number | Name | Date |
| --- | --- | --- |
| 465,335 | Bloom | Dec. 15, 1891 |

FOREIGN PATENTS

| Number | Country | Date |
| --- | --- | --- |
| 697,486 | France | Jan. 19, 1931 |